United States Patent
Berggren et al.

(10) Patent No.: US 11,290,314 B2
(45) Date of Patent: Mar. 29, 2022

(54) TRANSMITTING DEVICE, RECEIVING DEVICE AND METHODS THEREOF

(71) Applicant: Huawei Technologies Co., Ltd., Shenzhen (CN)

(72) Inventors: Fredrik Berggren, Kista (SE); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/077,750

(22) Filed: Oct. 22, 2020

(65) Prior Publication Data

US 2021/0099332 A1   Apr. 1, 2021

Related U.S. Application Data

(63) Continuation of application No. 16/726,560, filed on Dec. 24, 2019, now Pat. No. 10,819,551, which is a
(Continued)

(51) Int. Cl.
*H04L 27/26* (2006.01)
*H04J 11/00* (2006.01)
*H04W 72/04* (2009.01)

(52) U.S. Cl.
CPC ...... *H04L 27/2659* (2013.01); *H04J 11/0073* (2013.01); *H04L 27/2666* (2013.01); *H04L 27/2675* (2013.01); *H04W 72/0453* (2013.01)

(58) Field of Classification Search
CPC ............. H04L 27/2659; H04L 27/2666; H04L 27/2675; H04L 5/0094; H04L 5/0048; H04J 11/0073; H04W 72/0453
See application file for complete search history.

(56) References Cited

U.S. PATENT DOCUMENTS 7,983,292 B2 *   7/2011   Higuchi ............... H04L 5/0053
                                                              370/442
2011/0310878 A1   12/2011   Lindoff et al.
2017/0331613 A1   11/2017   Ly et al.

FOREIGN PATENT DOCUMENTS

| EP | 1434403 B1 | 10/2006 |
|---|---|---|
| WO | 2007142194 A1 | 12/2007 |
| WO | 2017123279 A1 | 7/2017 |

OTHER PUBLICATIONS

"3rd Generation Partnership Project; Technical Specification Group Radio Access Network; Evolved Universal Terrestrial Radio Access (E-UTRA); Base Station (BS) radio transmission and reception (Release 14)," 3GPP TS 36.104 V14.0.0, pp. 1-204, 3rd Generation Partnership Project, Valbonne, France (Jun. 2016).
(Continued)

*Primary Examiner* — Kabir A Timory
(74) *Attorney, Agent, or Firm* — Leydig, Voit & Mayer, Ltd.

(57) ABSTRACT

A transmitting device and a receiving device are described for a wireless communication system. The transmitting device transmits one or more synchronization signals on a carrier to at least one receiving device. A frequency of a synchronization signal among the one or more synchronization signals is located on a first frequency raster, and a carrier frequency of the carrier is deployed on a second frequency raster. The frequencies of two different synchronization signals among the one or more synchronization signals are located on different frequency positions in the first raster. The transmitting device transmits an indication of the carrier frequency to the at least one receiving device. The indication comprises at least one integer number. The receiving device derives the carrier frequency based on the at least one integer number.

40 Claims, 6 Drawing Sheets

Related U.S. Application Data continuation of application No. PCT/EP2017/070262, filed on Aug. 10, 2017.

(56) References Cited

OTHER PUBLICATIONS

"NR-SS: Frequency Raster," 3GPP TSG RAN WG1 Meeting #88, Athens, Greece, R1-1701574, pp. 1-6, 3rd Generation Partnership Project, Valbonne, France (Feb. 13-17, 2017).
"Discussion on wideband synchronization signal," 3GPP TSG RAN WG1 Meeting #88, Athens, Greece, R1-1703459, pp. 1-6, 3rd Generation Partnership Project, Valbonne, France (Feb. 13-17, 2017).
"Frequency location of the synchronization signals," 3GPP TSG RAN WG1 Meeting #88bis, Spokane, USA, R1-1705053, pp. 1-10, 3rd Generation Partnership Project, Valbonne, France (Apr. 3-7, 2017).
"Multiple SS blocks in wideband CC," 3GPP TSG RAN WG1 NR Ad-Hoc#2, Qingdao, P.R. China, R1-1709887, pp. 1-4, 3rd Generation Partnership Project, Valbonne, France (Jun. 27-30, 2017).
"On synchronization raster concept in NR," 3GPP TSG-RAN WG4 Meeting #83, Hangzhou, China, R4-1704524, pp. 1-3, 3rd Generation Partnership Project, Valbonne, France (May 13-17, 2017).
"3rd Generation Partnership Project; Technical Specification Group Radio Access Network; NR; Physical channels and modulation (Release 15)," 3GPP TS 38.211 V0.1.0, pp. 1-22, 3rd Generation Partnership Project, Valbonne, France (Jun. 2017).
"Synchronization and initial access mechanism in NR," 3GPP TSG RAN WG1 Meeting #86, Gothenburg, Sweden, R1-166107, pp. 1-4, 3rd Generation Partnership Project, Valbonne, France (Aug. 22-26, 2016).
"Overview of initial access and mobility," TSG-RAN WG1 Meeting #86, Gothenburg, Sweden, R1-167055, pp. 1-3, 3rd Generation Partnership Project, Valbonne, France (Aug. 22-26, 2016).
"WF on sync and carrier rasters," 3GPP TSG RAN WG1 #86, Gothenburg, Sweden, R1-168494, pp. 1-3, 3rd Generation Partnership Project, Valbonne, France (Aug. 22-26, 2016).
"Channel raster and synchronization signal locations," 3GPP TSG RAN WG1 Meeting #86bis, Lisbon, Portugal, R1-1608847, pp. 1-3, 3rd Generation Partnership Project, Valbonne, France (Oct. 10-14, 2016).
"WF on synchronization and carrier rasters," 3GPP TSG RAN WG1 #86bis, Lisbon, Portugal, R1-1611035, pp. 1-3, 3rd Generation Partnership Project, Valbonne, France (Oct. 10-14, 2016).
"Frequency location of the synchronization signals," 3GPP TSG RAN WG1 Meeting #87, Reno, USA, R1-1611693, pp.1-5, 3rd Generation Partnership Project, Valbonne, France (Nov. 14-18, 2016).
"Way forward on PRB indexing," 3GPP TSG-RAN WG1 Ad-Hoc #2, Qingdao, P.R. China, R1-1711855, pp. 1-2, 3rd Generation Partnership Project, Valbonne, France (Jun. 27-30, 2017).
"WF on common PRB indexing," 3GPP TSG-RAN WG1 Meeting #90, Prague, Czech Republic, R1-1715010, pp. 1-3, 3rd Generation Partnership Project, Valbonne, France (Aug. 21-25, 2017).
3rd Generation Partnership Project;Technical Specification Group Radio Access Network;NR;Radio Resource Control (RRC);Protocol specification (Release 15 ), 3GPP TS 38.331 V0.0.4, pp. 1-22, 3rd Generation Partnership Project, Valbonne, France (Jun. 2017).
"Consideration on E-UTRA Channel Raster," 3GPP TSG-RAN WG4 Meeting #42, St. Louis, USA, R4-070079, pp. 1-6, 3rd Generation Partnership Project, Valbone, France (Feb. 7, 2007).
"Multiple SS block indication in wideband CC [online]," 3GPP TSG RAN WG1 NR-Ad-Hoc#2, Qingdao, P.R. China, R1-1711352, pp. 1-6, 3rd Generation Partnership Project, Valbonne France (Jun. 17, 2017).

* cited by examiner

TRANSMITTING DEVICE, RECEIVING DEVICE AND METHODS THEREOF

CROSS-REFERENCE TO RELATED APPLICATIONS

This application is a continuation of U.S. patent application Ser. No. 16/726,560, filed on Dec. 24, 2019, now U.S. Pat. No. 10,819,551, which is a continuation of International Application No. PCT/EP2017/070262, filed on Aug. 10, 2017. All of the afore-mentioned patent applications are hereby incorporated by reference in their entireties.

TECHNICAL FIELD

The disclosure relates to a transmitting device and a receiving device. Furthermore, the disclosure also relates to corresponding methods and a computer program.

BACKGROUND

In 3GPP New Radio (NR), a Synchronization Signal (SS) block comprises NR-Primary Synchronization Signal (NR-PSS), NR-Secondary Synchronization Signal (NR-SSS) and NR-Physical Broadcast Channel (NR-PBCH). After detecting a synchronization signal block, a User Equipment (UE) is able to synchronize to a cell and obtain a cell ID of the cell as well as obtaining broadcast information. The broadcast information, e.g., the NR-Master Information Block (NR-MIB), may further contain information making it possible for the UE to detect the NR-Physical Downlink Shared Channel (NR-PDSCH) for obtaining system information, e.g., Remaining System Information (RMSI) and Other System Information (OSI). The NR-PBCH may include information about control channel resources wherein the UE may detect a NR-Physical Downlink Control Channel (NR-PDCCH) which is scheduling the RMSI through the NR-PDSCH. The NR-PBCH should be received over a large coverage area and therefore its payload should be minimized. Additional system information may be contained in the RMSI or the OSI.

In 3GPP NR, the synchronization signal block is located on a frequency raster (e.g., the center frequency of the SS block or the SS is on the raster), i.e., a set of frequencies with a predefined spacing between them. The frequency raster used for the synchronization signal block, herein denoted the synchronization signal raster, may be different from the frequency raster used for the NR channels, herein denoted the NR channel raster. The NR channel raster defines the carrier frequencies (e.g., the center frequency of a carrier) available for deploying an NR carrier. A carrier should be understood as an entity of the communication system which comprises channels and signals used for communications and carriers could be deployed in both downlink and uplink communications.

The synchronization signal raster and the NR channel raster may be selected for different purposes. Hence, the synchronization signal raster may, e.g., be sparser than the NR channel raster to reduce the search complexity for the UE. At least for initial cell selection, the UE searches for synchronization signals on the synchronization signal raster. The synchronization signal raster could, e.g., be a multiple of 15 kHz, which is a SubCarrier Spacing (SCS) in NR, say 300 kHz or 900 kHz. The NR system will provide different SCS, e.g., the SS may use 15, 30, 120 or 240 kHz SCS. Additional SCS such as 60 kHz may be applicable to other channels and signals. In addition, the synchronization signal raster may be different in different frequency bands, e.g., it could be 100 kHz in bands where LTE and NR should coexist. Similarly, the NR channel raster may be different in different frequency bands, e.g., it could be 100 kHz in bands where LTE and NR should coexist and could assume larger values in high frequency bands, where the amount of spectrum is much larger.

If the synchronization signal raster and NR channel raster are different, it is realized that the synchronization signal block may not be located around the center frequency of the NR carrier, e.g., the carrier frequency. Moreover, an NR carrier may include multiple synchronization signal blocks transmitted at different frequency locations. Hence, the synchronization signal raster could give synchronization signal frequency locations which are a subset of the channel frequencies, or which are not at all aligned with the channel frequencies or which are partly aligned with the channel frequencies.

In the conventional system 3GPP LTE, the synchronization signals are located around the center frequency of the carrier and the synchronization signal raster is the same as the channel raster. Hence, the UE could determine the carrier frequency implicitly from the detected frequency position of the synchronization signal. The carrier frequency information allows the UE to achieve one or several of the following non-limiting tasks:

Tune its oscillator to the carrier frequency.
Perform receiver filtering.
Perform mobility measurements on cells characterized by both cell ID and the carrier frequency.
Detect multiple synchronization signal blocks and determine which carrier they belong to.
Determine the Physical Resource Block (PRB) locations of the carrier.
Determine the locations of reference signals (RSs).
Receive system information.

In 3GPP NR, on the other hand, the UE will not be able to determine the carrier frequency implicitly from the detected synchronization signal block as the synchronization signal raster and the NR channel raster may be different. Hence, there is an issue on how to determine the NR carrier frequency in 3GPP NR.

SUMMARY

An objective of embodiments of the disclosure is to provide a solution which mitigates or solves the drawbacks and problems of conventional solutions.

The above and further objectives are solved by the subject matter of the independent claims. Further advantageous implementation forms of the embodiments of the present invention can be found in the dependent claims.

According to a first aspect of the invention, the above mentioned and other objectives are achieved with a transmitting device for a wireless communication system, the transmitting device being configured to transmit one or more synchronization signals on a carrier to at least one receiving device, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster; and transmit an indication of the carrier frequency to the at least one receiving device, wherein the indication comprises at least one integer number.

In one implementation of the first aspect, a frequency band in which the carrier is located comprises values determined from the first raster and the second raster, where values represent a frequency location.

A frequency raster in this disclosure can be understood to be a set of frequencies with a predefined spacing between them. The first frequency raster can be aligned or not be aligned with the second frequency raster. The frequency raster may be frequency dependent, i.e., different frequency rasters could be used in different frequency bands.

The transmitting device according to the first aspect relates to the case where there can be more than one synchronization signal in a carrier. In that case, the synchronization signals are located on different frequency positions on the first frequency raster. This does not however preclude the case that there is only one synchronization signal in the carrier. It is further noted that there could be multiple types of synchronization signals, such as primary synchronization signals, secondary synchronization signals, etc. Therefore, the one or more synchronization signal can comprise different types of synchronization signals herein. It should be further understood that the case where more than one synchronization signal is provided in a carrier and where the synchronization signals are located on different frequency positions on the first frequency raster, includes the case that one synchronization signal may comprise different types of synchronization signals (e.g., an NR-PSS and an NR-SSS) which are separated in time (e.g., in different OFDM symbols) but use the same frequency location (i.e., same raster value). Hence, one example is that a first pair of synchronization signals, NR-PSS_1 and NR-SSS_1, have the same frequency location, which is different from that one of a second pair of synchronization signals, NR-PSS_2 and NR-SSS_2. Furthermore, it should be understood that a carrier may also only comprise a first pair of synchronization signals, NR-PSS_1 and NR-SSS_1, which have the same frequency location.

It should further be noted that the carrier frequency may or may not be equal to the center frequency of the carrier. For a receiving device not capable of receiving a wideband carrier, it could transmit and/or receive on one part of the carrier. Such a part of a wideband carrier could be regarded as the carrier for a certain receiving device, wherein its carrier frequency is confined to be within the part of the wideband carrier, which may not be the central frequency of the carrier.

A transmitting device according to the first aspect provides a number of advantages over conventional solutions. An advantage of the transmitting device is that it allows the receiving device to determine the carrier frequency and potentially either/both of the frequency location of the synchronization signal within the carrier and the PRB and Reference Signal (RS) frequency locations.

In an implementation form of a transmitting device according to the first aspect, the frequency of the synchronization signal is a center frequency of the synchronization signal or of the carrier. In one example, the center frequency and the carrier frequency are different frequencies.

In an implementation form of a transmitting device according to the first aspect, the at least one integer number is a channel number.

An advantage with this implementation form is that it reduces the signalling overhead of indicating the carrier frequency since the mapping between a carrier frequency and channel number could be known. Furthermore, the carrier frequency can be determined uniquely from a channel number.

In an implementation form of a transmitting device according to the first aspect, the channel number is associated with a unique carrier frequency.

An advantage with this implementation form is that this would provide a simple way to unambiguously determine the carrier frequency, which reduces the receiver complexity.

In an implementation form of a transmitting device according to the first aspect, a frequency spectrum of the wireless communication system is divided into a plurality of non-overlapping frequency bands, and wherein the channel number is associated with a unique carrier frequency in a frequency band.

An advantage with this implementation form is that fewer bits are needed for encoding the information about the carrier frequency since the range of channel number values could be reduced.

In an implementation form of a transmitting device according to the first aspect, a range of the channel number depends on the frequency band.

An advantage with this implementation form is that the signalling overhead of the channel number could be reduced. For example, in frequency bands where there is a large amount of spectrum available, the frequency raster may contain few frequencies and consequently, few channel numbers.

In an implementation form of a transmitting device according to the first aspect, a frequency spacing between two neighbouring synchronization signals is a multiple of a sub-carrier spacing of the wireless communication system, and the first frequency raster is a subset of the second frequency raster.

An advantage with this implementation form is that the synchronization signals align with the subcarriers of the other channels and signals of the carrier.

In an implementation form of a transmitting device according to the first aspect, the at least one integer number is a relative channel number.

An advantage with this implementation form is that it is possible to further reduce the overhead of signalling the carrier frequency.

In an implementation form of a transmitting device according to the first aspect, the relative channel number is dependent on a maximum carrier bandwidth of the wireless communication system.

An advantage with this implementation form is that it is possible to further reduce the overhead of signalling the carrier frequency considering that the synchronization signal could not be located farther away from the carrier frequency than the maximum carrier bandwidth.

In an implementation form of a transmitting device according to the first aspect, a range of the relative channel number is dependent on the maximum carrier bandwidth.

An advantage with this implementation form is that it is possible to further reduce the overhead of signalling the carrier frequency considering that the synchronization signal could not be located farther away from the carrier frequency than the maximum carrier bandwidth.

In an implementation form of a transmitting device according to the first aspect, the maximum carrier bandwidth is frequency dependent.

An advantage with this implementation form is that a wider carrier bandwidth is only provided in frequency bands where there is large amount of spectrum available.

In an implementation form of a transmitting device according to the first aspect, the at least one integer number is a first index indicating a first frequency location relative to the frequency of the synchronization signal and a second index indicating a second frequency location relative to the first frequency location.

An advantage with this implementation form is that it is possible to further reduce the overhead of signalling the carrier frequency.

In an implementation form of a transmitting device according to the first aspect, the first frequency location is given in number of physical resource blocks, and the second frequency location is given in a resolution of the second frequency raster.

An advantage with this implementation form is that it is possible to further reduce the overhead of signalling the carrier frequency and that the synchronization signals may be aligned in frequency position with the other channels and signals being located in resource blocks.

In an implementation form of a transmitting device according to the first aspect, the first frequency location is given in a resolution of the first frequency raster, and the second frequency location is given in a resolution of the second frequency raster.

An advantage with this implementation form is that it is possible to further reduce the overhead of signalling the carrier frequency considering that the first raster may be sparser than the second raster.

In an implementation form of a transmitting device according to the first aspect, the transmitting device is further configured to transmit the indication in at least one of: Master Information Block (MIB), Remaining System Information (RMSI), Other System Information (OSI), and Radio Resource Control (RRC).

An advantage with this implementation form is that the signalling is made in channels which have the capability to contain more information that what the synchronization signal can do. Encoding additional information in the synchronization signals, increase the receiver complexity, since they are typically based on synchronization sequences, while the MIB, RMSI, OSI and RRC signalling are carried in channels better suited for information transmission.

According to a second aspect of the invention, the above mentioned and other objectives are achieved with receiving device for a wireless communication system, the receiving device being configured to receive one or more synchronization signals on a carrier from a transmitting device, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster;

receive an indication of the carrier frequency from the transmitting device, wherein the indication comprises at least one integer number; and derive the carrier frequency based on the at least one integer number.

In one implementation of the second aspect, a frequency band in which the carrier is located comprises values determined from the first raster and the second raster.

A receiving device according to the second aspect provides a number of advantages over conventional solutions. An advantage is that it allows the receiving device to determine the carrier frequency and potentially either/both of the frequency location of the synchronization signal within the carrier and the PRB and RS frequency locations.

In an implementation form of a receiving device according to the second aspect, a frequency spectrum of the wireless communication system is divided into a plurality of non-overlapping frequency bands, and the at least one integer number is associated with a frequency band, the receiving device is further configured to map the at least one integer number based on the frequency band so as to derive the carrier frequency.

According to a third aspect of the invention, the above mentioned and other objectives are achieved with a method for a transmitting device, the method comprises transmitting one or more synchronization signals on a carrier to at least one receiving device, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster; and transmitting an indication of the carrier frequency to the at least one receiving device, wherein the indication comprises at least one integer number.

In one implementation of the third aspect, a frequency band in which the carrier is located comprises values determined from the first raster and the second raster.

In one implementation of the third aspect, the method further comprises obtaining at least one synchronization signal previous to transmitting the at least one synchronization signal.

The method according to the third aspect can be extended into implementation forms corresponding to the implementation forms of the transmitting device according to the first aspect. Hence, an implementation form of the method comprises the feature(s) of the corresponding implementation form of the transmitting device.

The advantages of the methods according to the third aspect are the same as those for the corresponding device claims according to the first aspect.

According to a fourth aspect of the invention, the above mentioned and other objectives are achieved with a method for a receiving device, the method comprises receiving one or more synchronization signals on a carrier from a transmitting device, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster;

receiving an indication of the carrier frequency from the transmitting device, wherein the indication comprises at least one integer number; and deriving the carrier frequency based on the at least one integer number.

In one implementation of the fourth aspect, a frequency band in which the carrier is located comprises values determined from the first raster and the second raster.

The method according to the fourth aspect can be extended into implementation forms corresponding to the implementation forms of the receiving device according to the second aspect. Hence, an implementation form of the method comprises the feature(s) of the corresponding implementation form of the receiving device.

The advantages of the methods according to the fourth aspect are the same as those for the corresponding device claims according to the second aspect.

The invention also relates to a computer program, characterized in code means, which when run by processing means causes said processing means to execute any method according to the embodiments of the present invention. Further, the invention also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
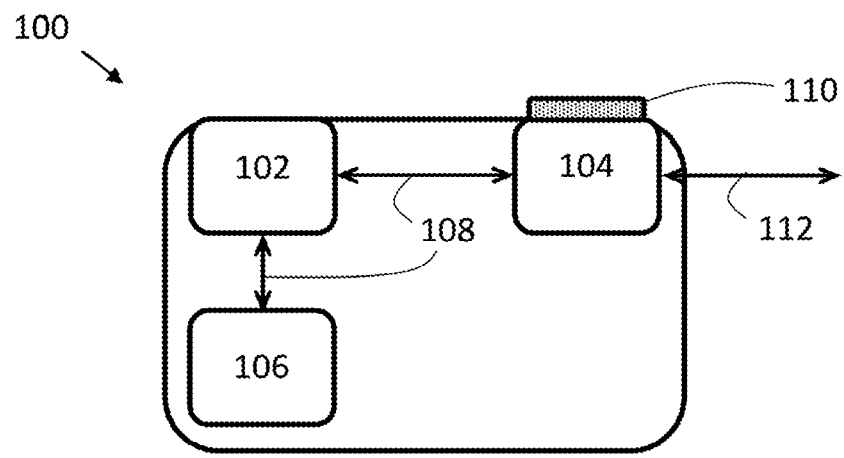
FIG. 1 shows a transmitting device according to an implementation form of the disclosure.

FIG. 1 shows a transmitting device 100 according to an implementation form of the disclosure. In the implementation shown in FIG. 1, the transmitting device 100 comprises a processor 102, a transceiver 104 and a memory 106. The processor 102 is coupled to the transceiver 104 and the memory 106 by communication means 108 known in the art. The transmitting device 100 may be configured for both wireless and wired communications in wireless and wired communication systems, respectively. The wireless communication capability is provided with an antenna 110 coupled to the transceiver 104, while the wired communication capability is provided with a wired communication interface 112 coupled to the transceiver 104.

That the transmitting device 100 is configured to perform certain actions and/or functions according to the disclosure should in this disclosure be understood to mean that the transmitting device 100 comprises suitable means, such as e.g. the processor 102 and the transceiver 104, configured to perform said actions and/or functions.

The transmitting device 100 in FIG. 1 is configured to transmit one or more synchronization signals (SSs) on a carrier to at least one receiving device 300, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster. The transmitting device 100 is further configured to transmit an indication of the carrier frequency to the at least one receiving device 300. The indication herein comprises at least one integer number.

Figure 2:
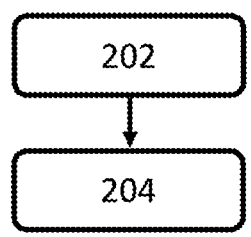
FIG. 2 shows a method according to an implementation form of the disclosure.

FIG. 2 shows a flow chart of a corresponding method 200 which may be executed in a transmitting device 100, such as the one shown in FIG. 1. The method 200 comprises transmitting 202 one or more synchronization signals on a carrier to at least one receiving device 300, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster. The method further comprises transmitting 204 an indication of the carrier frequency to the at least one receiving device 300. The indication comprises at least one integer number.

Figure 3:
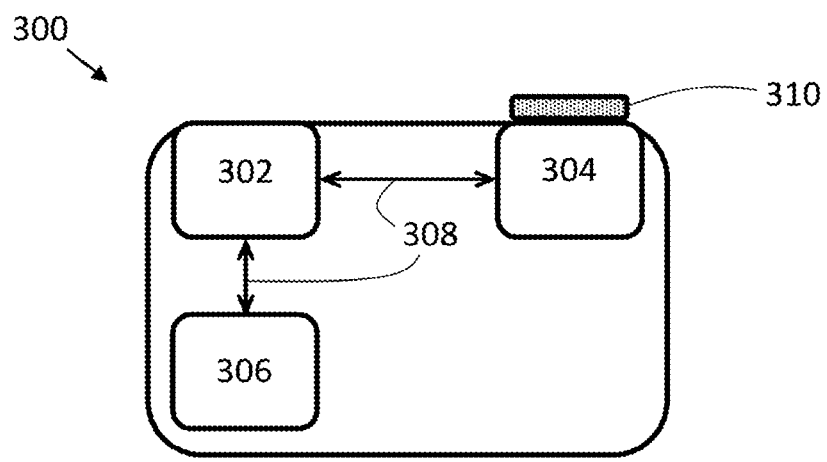
FIG. 3 shows a receiving device according to an implementation form of the disclosure.

FIG. 3 shows a receiving device 300 according to an implementation form of the disclosure. In the implementation shown in FIG. 3, the receiving device 300 comprises a processor 302, a transceiver 304 and a memory 306. The processor 302 is coupled to the transceiver 304 and the memory 306 by communication means 308 known in the art. The receiving device 300 further comprises an antenna 308 coupled to the transceiver 302, which means that the receiving device 300 is configured for wireless communications in a wireless communication system.

That the receiving device 300 is configured to perform certain actions and/or functions according to the disclosure should in this disclosure be understood to mean that the receiving device 300 comprises suitable means, such as e.g. the processor 302 and the transceiver 304, configured to perform said actions and/or functions.

The receiving device 300 is configured to receive one or more synchronization signals on a carrier from a transmitting device 100, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster. The receiving device 300 is further configured to receive an indication of the carrier frequency from the transmitting device 100, wherein the indication comprises at least one integer number. The receiving device 300 is further configured to derive the carrier frequency based on the at least one integer number. Examples of how the carrier frequency is derived from the at least one integer number is explained in the following disclosure.

Figure 4:
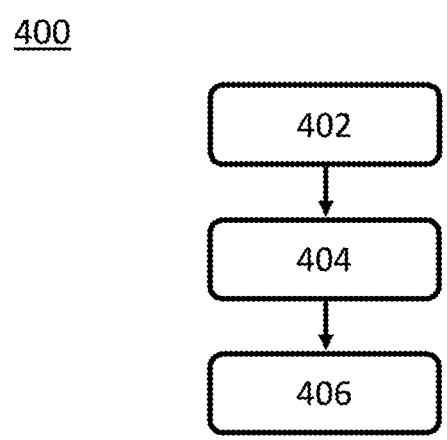
FIG. 4 shows another method according to an implementation form of the disclosure.

FIG. 4 shows a flow chart of a corresponding method 400 which may be executed in a receiving device 300, such as the one shown in FIG. 3. The method 400 comprises receiving 402 one or more synchronization signals on a carrier from a transmitting device 100, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster. The method 400 further compromises receiving 404 an indication of the carrier frequency from the transmitting device 100, wherein the indication comprises at least one integer number. The method 400 further comprises deriving 406 the carrier frequency based on the at least one integer number.

Figure 5:
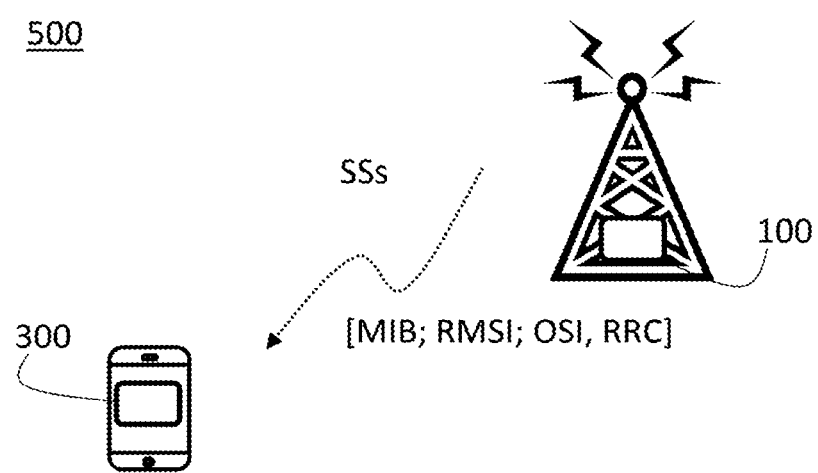
FIG. 5 shows a wireless system according to an implementation form of the disclosure.

FIG. 5 shows a wireless communication system 500 according to an implementation of the disclosure. The wireless communication system 500 comprises a transmitting device 100 and a receiving device 300 configured to operate in the wireless communication system 500. In this example, the downlink (DL) case is illustrated which means that the transmitting device 100 is part of a network node (such as a base station) whilst the receiving device 300 is part of a client device (such as a UE). In the wireless communication system 500, synchronization signals (SSs) are transmitted by the transmitting device 100 and received by the receiving device 300. For simplicity, the wireless communication system 500 shown in FIG. 5 only comprises one transmitting device 100 and one receiving device 300. However, the wireless communication system 500 may comprise any number of transmitting devices and any number of receiving devices without deviating from the scope of the disclosure.

It is to be noted that the present solution is not limited to the downlink case and can therefore be implemented in the uplink (UL) or both in the downlink and the uplink. Hence, the transmitting device 100 and the receiving device 300 may be associated with a network node and/or a client device depending on the implementation case.

In one example, the frequency spectrum of the wireless communication system 500 is divided into a plurality of non-overlapping frequency bands, and the at least one integer number is associated with a frequency band. In this case, the receiving device 300 is configured to map the at least one integer number based on the frequency band so as to derive the carrier frequency.

The indication of the carrier frequency herein could be signaled by the transmitting device 100 to the receiving device 300 using several different methods, e.g., depending on when during the access procedure the receiving device 300 needs to be aware of the carrier frequency. The transmitting device 100 is hence configured to transmit the indication in at least one of: a Master Information Block (MIB), Remaining System Information (RMSI), Other System Information (OSI), and Radio Resource Control (RRC).

The MIB offers the quickest way of delivering the carrier frequency information in a broadcast channel. On the other hand, it is beneficial to minimize the payload of the broadcast channel.

The RMSI can be contained in the NR-PDSCH which is scheduled by the NR-PDCCH, where information related to the configuration of the NR-PDCCH/NR-PDSCH are contained in the NR-MIB. If the carrier frequency information is contained in the RMSI, it implies that the RMSI should be detectable without knowing the carrier frequency. Hence, resources in NR-PDCCH/NR-PDSCH for determining RMSI should not depend on the carrier frequency but may be determined from the NR-SS and/or NR-PBCH.

The OSI can be contained in the NR-PDSCH which is scheduled by the NR-PDCCH, where information related to the configuration of the NR-PDCCH/NR-PDSCH are contained in the NR-MIB and/or the RMSI. If the carrier frequency information is contained in the OSI, it implies that the OSI should be detectable without knowing the carrier frequency. Hence, resources in NR-PDCCH/NR-PDSCH for determining OSI should not depend on the carrier frequency but may be determined from the NR-SS and/or NR-PBCH.

The disclosure is also applicable if the indication of the carrier frequency is jointly transmitted by any of the NR-MIB, RMSI and OSI.

When RRC signaling is used for signaling and the carrier frequency is used to define cells in higher layers for mobility measurements, a cell description comprising both cell ID and carrier frequency could be signaled by RRC. In this case, the overhead of signaling the carrier frequency is less critical since RRC signaling is carried by the NR-PDSCH.

In the following, possible implementation forms of the disclosure are described and explained. In this respect a wireless communication system 500 where synchronization signals could be placed on a first frequency raster $\{f_{SS,i}\}$ (i.e., a set of frequencies) resulting in a minimum separation of $|f_{SS,i} - f_{SS,i+1}| = \Delta f_{SS}$ Hz and where carriers could be placed on a second frequency raster $\{f_{C,i}\}$ resulting in a minimum separation of $|f_{C,i} - f_{C,i+1}| = \Delta f_C$ Hz, is considered. The first frequency raster and the second frequency raster could in such a system be frequency band dependent, i.e., the values $\Delta f_{SS}(f_{SS,i})$ and $\Delta f_C(f_{C,i})$ representing the frequency spacing may not be constants and could be a function of the frequency. It is however noted that the disclosure is not limited to the above described type of wireless communication system.

In one implementation of the disclosure, the carrier frequency is indicted as a channel number C. In this case the mapping from a channel number to a carrier frequency, $C \rightarrow f_{C,i}$, could be pre-defined and be known to the receiving device 300. As an example, the mapping could be performed using a closed form expression, such as: $F_{DL} = F_{DL\_low} \Delta f_C (C - N_{Offs\_DL})$, where the constants $F_{DL\_low}$ and $N_{offs\_DL}$ can be predefined and $F_{DL} = f_{C,i}$.

In one realization, N channel frequencies $\{f_{C,i}\}_{i=0}^{N-1}$ could be enumerated from, $0 \leq C \leq N-1$. In this case, there is no requirement that the synchronization signal frequency locations are a subset of the channel frequencies, i.e., $\{f_{SS,i}\} \subseteq \{f_{C,i}\}$ may not hold. On the other hand, this implementation does not preclude that the synchronization signal frequency locations are a subset of the channel frequencies.

Figure 6:
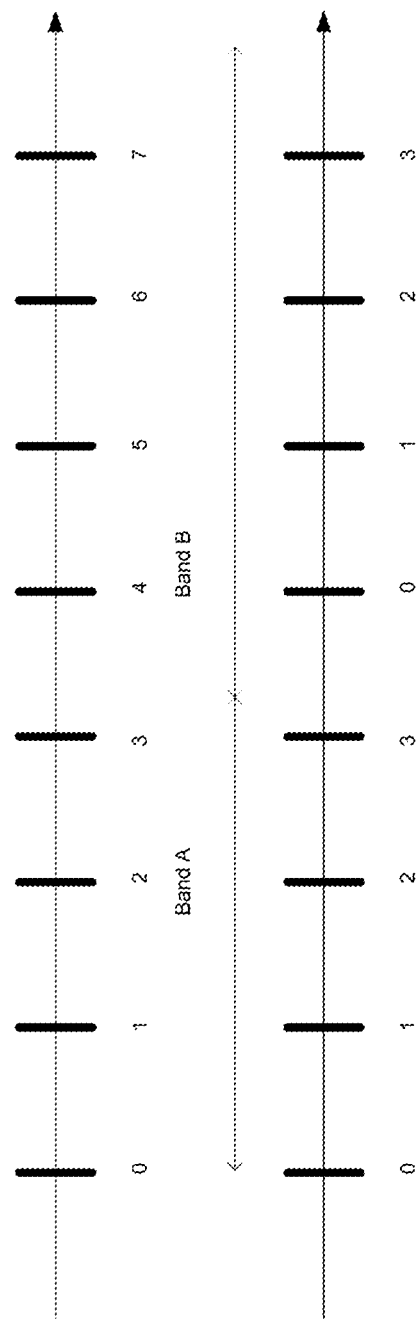
FIG. 6 shows enumeration of the carrier frequency according to implementation forms of the disclosure.

In one example when the carrier frequency is indicted as a channel number C, a single enumeration is applied over all frequency bands which means that each channel number is associated with a unique carrier frequency. That is, the mapping of a channel number to a carrier frequency $C \rightarrow f_{C,i}$ is a one-to-one mapping and every value of the channel number C is associated with a unique frequency $f_{C,i}$. This implementation is illustrated in the top axis in FIG. 6 in which the frequency band is divided into two bands, i.e. band A and band B, and 8 carrier frequencies are shown. In the top axis a single enumeration is applied and 3 bits are therefore needed for representing a carrier frequency. This would provide a simple way to unambiguously determine the carrier frequency but requires the size N of the set of channel numbers to encompass all carrier frequencies of the system. The mapping could be frequency band specific and pre-defined, e.g., $F_{DL} = F_{DL\_low} \Delta f_C(C)(C - N_{offs\_DL})$, where the raster value is a function of the channel number, i.e. $\Delta f_C(C)$.

In another example when the carrier frequency is indicted as a channel number C, multiple enumerations are applied over all frequency bands. This can be realized by dividing the spectrum into pre-defined disjoint frequency bands and performing an enumeration independently for each frequency band. Therefore, the frequency spectrum of the wireless communication system 500 is divided into a plurality of non-overlapping frequency bands, and wherein the channel number C is associated with a unique carrier frequency in a frequency band.

Hence, the mapping from a channel number to a carrier frequency $C \rightarrow f_{C,i}$ is a one-to-many mapping and every value of the channel number C could be associated with more than one frequency $f_{C,i}$. However, this still provides the receiving device 300 with a unique mapping $C \rightarrow f_{C,i}$ since it knows in which frequency band it is detecting the synchronization signal block. It is noted however that the mapping may be different in different frequency bands, e.g., the mapping could be frequency band specific and pre-defined, e.g., $F_{DL} = F_{DL\_low} \Delta f_C(C)(C - N_{Offs\_DL})$, where the raster value is a function of the channel number, $\Delta f_C(C)$. This implementation is illustrated in the bottom axis in FIG. 6 in which the enumeration is repeated for each band A and B. Hence, 2 bits are needed in this case for representing a carrier frequency. The advantage of this is that fewer bits are needed for encoding the information about the carrier frequency, e.g., a reduction from $\log_2 N$ bits to $\log_2 (N/M)$ when N frequency positions are divided into M frequency bands. It is one objective to minimize the number of bits needed for indicating the carrier frequency, since the number of carrier frequencies may be very large while a large signaling overhead incurs smaller area coverage (i.e., higher code rates) for a given channel. Area coverage is particularly important for channels used for the initial access, such as synchronization signals, broadcast signals and for channels delivering system information. When carrier frequency is used together with cell ID, e.g., to define a measurement object, further information about the designated frequency band may be needed in order for the receiving device 300 to be able to determine the correct carrier frequency uniquely.

In one implementation, the channel number C can be indicated using $\log_2 SC$ bits in MIB, where SC is the total number of subcarriers within a given frequency band. This gives maximum deployment flexibility at the cost of signaling overhead.

Further possible implementations of the disclosure apply when a frequency spacing between two neighboring synchronization signals is a multiple of a sub-carrier spacing of the wireless communication system 500, and wherein the first frequency raster is a subset of the second frequency raster. In other words, the distance between two neighboring synchronization signal frequency locations, $\Delta f_{SS}$, is a multiple of a SubCarrier Spacing (SCS) supported by the wireless communication system 500. Further, the synchronization signal frequency locations are a subset of the channel frequencies, i.e., $\{f_{SS,i}\} \subseteq \{f_{C,i}\}$. Herein, a multiple of a SCS may include the case where the distance between two synchronization signal frequency locations, $\Delta f_{SS}$, is a multiple n of a PRB bandwidth B (which is also a multiple of a SCS) for a certain given SCS, $\Delta f_{SS} = n \cdot B$, where n is a positive integer.

In one implementation when the above assumptions hold, it is disclosed here that the carrier frequency is indicated using a relative channel number $\Delta C$, i.e. $-(N-1) \leq \Delta C \leq N-1$. In this case the receiving device 300 detects the synchronization signal block frequency location $f_{SS,i}$, which is on the channel raster and determines a relative carrier frequency $\Delta C \rightarrow \Delta f_{C,i}$ based on a pre-defined mapping rule. For example, $\Delta f_{C,i}$ may be a multiple of the carrier frequency raster, $\Delta f_C = |f_{C,i} - f_{C,i+1}|$. The carrier frequency is derived based on the relative number, $f_{SS,i} + \Delta f_{C,i}$. Since $\{f_{SS,i}\} \subseteq \{f_{C,i}\}$, it follows that $f_{SS,i} + \Delta f_{C,i} \subseteq \{f_{C,i}\}$. The number of bits to represent the relative channel number could be $\log_e(2N+1)$ where N is the number of synchronization signal frequencies.

In another implementation when the above assumptions hold, it is disclosed here that the carrier frequency is indicated using a relative channel number $\Delta C$, i.e. $-(N-1) \leq \Delta C \leq N-1$. In this case the receiving device 300 is informed of a frequency location $f_{WB}$, which is on the channel raster and determines a relative carrier frequency $\Delta C \rightarrow \Delta f_{C,i}$ based on a pre-defined mapping rule. For example, $\Delta f_{C,i}$ may be a multiple of the carrier frequency raster, $\Delta f_C = |f_{C,i} - f_{C,i+1}|$. The carrier frequency is derived based on the relative number, $f_{WB} + \Delta f_{C,i}$. Since $f_{WB} \in \{f_{C,i}\}$, it follows that $f_{WB} + \Delta f_{C,i} \subseteq \{f_{C,i}\}$. The number of bits to represent the relative channel number could be $\log_2(2N+1)$ where N is the number of channel rasters on this frequency band.

It is realized that one advantage is that the number N could be determined from the maximum carrier bandwidth, i.e., the maximum number of carrier frequencies that could be located within a carrier. It is realized that this would offer a minimum value of N since the carrier frequency could not be located farther away from the synchronization signal block frequency than the carrier bandwidth. For example, suppose that the maximum carrier bandwidth is W Hz, it follows that $N \leq \lceil W/|f_{C,i} - f_{C,i+1}| \rceil$, utilizing the ceiling operator, such that $\lceil x \rceil$ denotes the smallest integer being larger than x. Furthermore, the maximum carrier bandwidth may depend on the frequency band, e.g., very wide carriers may be used in higher frequency bands. Also, the second raster may be different in different frequency bands. Therefore, the number N could be frequency dependent such as $N(f) \leq \lceil W(f)/|f_{C,i} - f_{C,i+1}| \rceil$.

If other restrictions could be assumed, in addition to requiring placement on the first raster, on the location the synchronization signal block(s) within the carrier, the number N could be decreased further. For example, suppose that the carrier frequency cannot be located farther away than X Hz (where X is smaller than the maximum carrier bandwidth) from the synchronization signal block frequency $f_{SS,i}$, it follows that $N \leq \lceil X/|f_{C,i} - f_{C,i+1}| \rceil$.

The number N could follow a single enumeration and be derived based on all synchronization signal frequencies in the wireless communication system 500.

The number N could in another case follow multiple enumerations. This is realized by dividing the spectrum into pre-defined disjoint frequency bands and performing an enumeration independently for each frequency band. Hence, the mapping $\Delta C \rightarrow \Delta f_{C,i}$ is a one-to-many mapping and every value $\Delta C$ could be associated with more than one frequency $\Delta f_{C,i}$. However, this still provides the receiving device 300 with a unique mapping $\Delta C \rightarrow f_{C,i}$ since it knows in which frequency band it is detecting the synchronization signal block. The advantage of this is that fewer bits need to be used for encoding the information about the carrier frequency, e.g., a reduction from $\log_2 (2N+1)$ bits to $\log_2 (2N/M)$ when N frequency positions are divided into M frequency bands. When carrier frequency is used together with cell ID, e.g., to define a measurement object, further information about the designated frequency band may be needed in order for the receiving device 300 to uniquely be able to determine the correct carrier frequency.

In another implementation of the disclosure when the above assumptions hold, the carrier frequency is indicated using a first index and a second index. The first index indicates a first frequency location relative to the frequency location of the synchronization signal and the second index indicates a second frequency location relative to the first frequency location indicated by the first index.

In possible implementations of the disclosure, the first frequency location is given in number of PRBs or in a resolution of the first frequency raster. The second frequency location is therefore given in a resolution the second frequency raster. By resolution of a raster, it is here meant the frequency spacing between two neighbouring frequencies of the raster.

Figure 7:
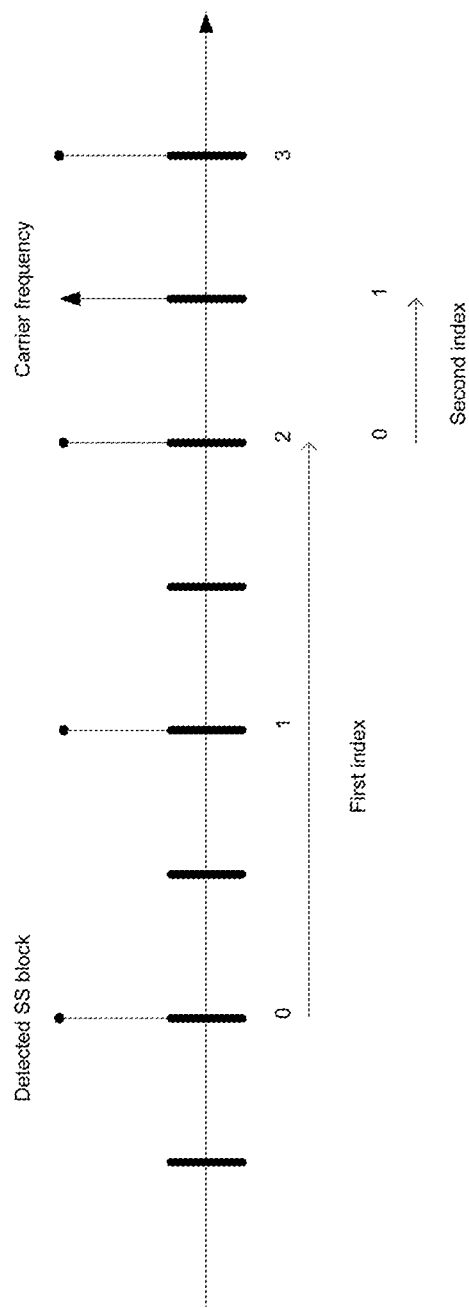
FIG. 7 shows indication of the carrier frequency by using a first index and a second index according to an implementation form of the disclosure.

In one realization of this implementation, it is assumed that the distance between two synchronization signal frequency locations, $\Delta f_{SS}$, is a multiple n of a PRB bandwidth B for a certain given SCS, $\Delta f_{SS}=n \cdot B$, where n is a positive integer. The first index $-(M-1) \leq \delta \leq M-1$ therefore determines an offset, e.g., in terms of PRB bandwidth steps B or first frequency raster steps (also denoted SS raster steps, or SS raster resolution), from the detected synchronization signal frequency location wherein the carrier frequency is located. In one realization, the value M determines the number of PRBs or first frequency raster steps $\Delta f_{SS}$ that could fit into the frequency band. In another realization, the value M determines the number of PRBs or first frequency raster steps $\Delta f_{SS}$ that could fit into the maximum carrier bandwidth. It is realized that this may reduce the value of M since the distance between the synchronization signal and the carrier frequency cannot be larger than the maximum carrier bandwidth (which may be frequency band dependent). The second index provides the location of the carrier frequency within the PRB or within the frequency region confined by two consecutive synchronization signal frequencies. For example, in FIG. 7, the carrier frequency is located 3 PRBs (second index) away from the detected synchronization signal block frequency (i.e., $f_{SS,i}$) and the carrier frequency is located on the second carrier frequency (first index) from the location derived from the first index. This allows reducing the number of bits for representing the carrier frequency, assuming that the first index has steps or granularity which are larger than the second frequency raster and that there is a constraint on how many PRBs or synchronization signal raster positions away from the synchronization signal block frequency that the carrier frequency could be placed, e.g., being limited by the maximum carrier bandwidth.

One consequence of the disclosure is that, once the receiving device 300 has determined the carrier frequency, it could determine the PRB frequency locations and/or the RS frequency locations within a carrier, assuming their frequency locations are associated with the carrier frequency. For example, if the system bandwidth is signaled to the receiving device 300 with the carrier frequency and the system bandwidth, the PRB locations within the carrier frequency band can be determined. For each system bandwidth, one PRB location is determined.

Figure 8:
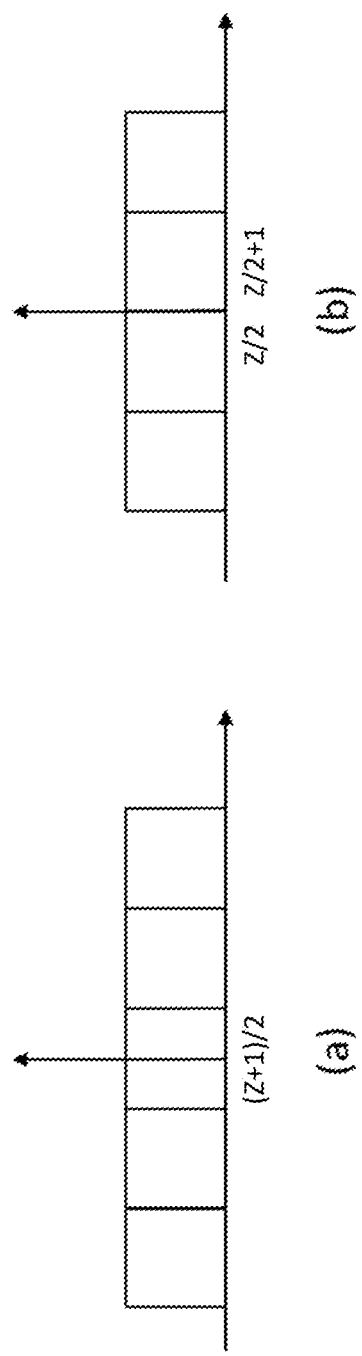
FIG. 8 shows PRB grids within the frequency band according to implementation forms of the disclosure.

In one example, if the total number of PRBs within the frequency band Z is odd, then the central frequency of PRB #(Z+1)/2 is aligned with the carrier frequency. In this case, the PRB location is located as illustrated in FIG. 8 (*a*). If the total number of PRBs within the frequency band (Z) is even, then the carrier frequency is located between PRB #(Z/2) and PRB #(Z/2+1) and the PRB is located as illustrated in FIG. 8 (*b*).

An advantage of aligning the PRBs from a given frequency (e.g., the carrier frequency) in a carrier is that the PRBs become frequency position aligned between carriers. This enables use of techniques utilizing inter-cell interference coordination.

The network node herein may also be denoted as a radio network node, an access network node, an access point, or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM). The radio network node may also be a base station corresponding to the fifth generation (5G) wireless systems.

The client device herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the network node and the client device comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the network node and the client device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

Further embodiments of the disclosure:

Embodiment 1 comprising the method (200) according to any one of the:

Embodiment 1a comprising a method (200) for a transmitting device (100), the method comprising transmitting (202) one or more synchronization signals on a carrier to at least one receiving device (300), wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster; and transmitting (204) an indication of the carrier frequency to the at least one receiving device (300), wherein the indication comprises at least one integer number; OR Embodiment 1b comprising the method (200) according to embodiment 1 a, wherein the at least one integer number is a channel number; OR Embodiment 1c comprising the method (200) according to embodiment 1b, wherein the channel number is associated with a unique carrier frequency; OR Embodiment 1d comprising the method (200) according to embodiment 1b or 1c, wherein a frequency spectrum of the wireless communication system (500) is divided into a plurality of non-overlapping frequency bands, and wherein the channel number is associated with a unique carrier frequency in a frequency band; OR Embodiment 1e comprising the method (200) according to embodiment 1e, wherein a range of the channel number depends on the frequency band;

Such that according to any of the preceding embodiments 1a to 1e, wherein a frequency spacing between two neighbouring synchronization signals is a multiple of a sub-carrier spacing of the wireless communication system (500), and wherein the first frequency raster is a subset of the second frequency raster.

wherein the at least one integer number is a relative channel number.

Embodiment 2 comprising the method (200) according to embodiment 1, wherein the relative channel number is dependent on a maximum carrier bandwidth of the wireless communication system (500).

Embodiment 3 comprising the method (200) according to Embodiment 2, wherein a range of the relative channel number is dependent on the maximum carrier bandwidth.

Embodiment 4 comprising the method (200) according to embodiment 2 or 3, wherein the maximum carrier bandwidth is frequency dependent.

Embodiment 5 comprising the method (200) according to embodiment 1, wherein the at least one integer number is a first index indicating a first frequency location relative to the frequency of the synchronization signal and a second index indicating a second frequency location relative to the first frequency location.

Embodiment 6 comprising the method (200) according to embodiment 5, wherein the first frequency location is given in number of physical resource blocks, and wherein the second frequency location is given in a resolution of the second frequency raster.

Embodiment 7 comprising the method (200) according to embodiment 5, wherein the first frequency location is given in a resolution of the first frequency raster, and wherein the second frequency location is given in a resolution of the second frequency raster.

Embodiment 8 comprising the method (200) according to embodiment 1a, the method further comprising a frequency band in which the carrier is located comprises values determined from the first raster and the second raster.

Embodiment 9 comprising the method (200) according to embodiment 1a, the method further comprises obtaining at least one synchronization signal previous to transmitting the at least one synchronization signal.

Embodiment 10 comprising a processor (102), configured to perform the method according to any one of the embodiments of the disclosure.

Embodiment 11 comprising a processor (302), configured to perform the method according to any one of the embodiments of the disclosure.

Embodiment 12 comprising a computer readable storage medium, comprising a computer program, wherein when the computer program runs on a computer, the computer is enabled to perform the method according to any one of the embodiments of the disclosure.

Embodiment 13 comprising a computer program product, wherein the computer program product comprises a computer program, and when the computer program runs on a computer, the computer is enabled to perform the method according to any one of the embodiments of the disclosure.

Embodiment 14 comprising a communications system (500), comprising:

a receiving device (300) according to any one of claims 15 to 20 and a transmitting device (100) according to any one of any one of the embodiments of the disclosure.

Embodiment 15 comprising an apparatus (100), comprising:

a memory (106), configured to store a computer program; and a processor (102), configured to invoke the computer program from the memory and run the computer program, to perform the method according to any one of the embodiments of the disclosure Embodiment 16 comprising an apparatus (300), comprising:

a memory (306), configured to store a computer program; and a processor (302), configured to invoke the computer program from the memory and run the computer program, to perform the method according to any one of the embodiments of the disclosure.

Embodiment 17 comprising a method for a receiving device, the method comprising receiving one or more synchronization signals on a carrier from a transmitting device, wherein a frequency of a synchronization signal among the one or more synchronization signals is located on a first frequency raster and a carrier frequency of the carrier is deployed on a second frequency raster, and wherein frequencies of two different synchronization signals among the one or more synchronization signals are located on different frequency positions in the first raster;

receiving an indication of the carrier frequency from the transmitting device, wherein the indication comprises at least one integer number; and deriving the carrier frequency based on the at least one integer number.

Embodiment 18 comprising the method according to embodiment 17, wherein the at least one integer number is a channel number.

Embodiment 19, comprising the method according to embodiment 17, wherein the channel number is associated with a unique carrier frequency.

Embodiment 20 comprising the method according to embodiment 17, wherein a frequency spacing between two neighbouring synchronization signals is a multiple of a sub-carrier spacing of the wireless communication system, and wherein the first frequency raster is a subset of the second frequency raster.

Embodiment 21 comprising the method according to embodiment 17, receive the indication in at least one of: a Master Information Block (MIB), Remaining System Information (RMSI), Other System Information (OSI), and Radio Resource Control (RRC).

The invention claimed is:

1. A transmitting device for a wireless communication system, comprising:
   a non-transitory computer-readable memory, configured to store a computer program comprising computer-executable instructions; and
   a processor, configured to execute the computer-executable instructions of the computer program to cause the transmitting device to perform the following:
   transmitting, to an apparatus, one or more synchronization signals of a carrier, wherein a synchronization signal of the one or more synchronization signals corresponds to a frequency located on a first frequency raster, wherein a carrier frequency of the carrier is deployed on a second frequency raster; and
   transmitting, to the apparatus, an indication of the carrier frequency that comprises at least one integer number,
   wherein the first frequency raster is a subset of the second frequency raster, and
   wherein a frequency spacing between two neighboring synchronization signals is a multiple of a sub-carrier spacing of the wireless communication system.

2. The transmitting device according to claim 1, wherein the indication of the carrier frequency, provided by the transmitting device in the form of at least one integer number, is used for the apparatus to derive the carrier frequency.

3. The transmitting device according to claim 1, wherein the at least one integer number is a channel number.

4. The transmitting device according to claim 3, wherein the channel number is associated with a unique carrier frequency.

5. The transmitting device according to claim 3, wherein a frequency spectrum of the wireless communication system is divided into a plurality of non-overlapping frequency bands, and wherein the channel number is associated with a unique carrier frequency in a frequency band.

6. The transmitting device according to 5, wherein a range of the channel number depends on the frequency band.

7. The transmitting device according to claim 1, wherein the indication of the carrier frequency is transmitted in at least one of the group consisting of: a master information block (MIB), a remaining system information (RMSI), an other system information (OSI), and a radio resource control (RRC).

8. The transmitting device according to claim 1, wherein the frequency of a synchronization signal among the one or more synchronization signals is located on the first frequency raster.

9. The transmitting device according to claim 8, wherein the transmitting device further comprises a receiver.

10. The transmitting device according to claim 1, wherein the first frequency raster is associated with a frequency range where frequencies corresponding to the one or more synchronization signals are deployed.

11. The transmitting device according to claim 1, wherein two differing synchronization signals among the one or more synchronization signals correspond to two differing frequency positions in the first frequency raster.

12. The transmitting device according to claim 1, wherein the at least one integer number comprises a first index and a second index, the first index indicating an offset indicative of a first frequency location relative to a location of the frequency of the synchronization signal, and the second index indicating a second frequency location relative to the first frequency location.

13. The transmitting device according to claim 12, wherein the first frequency location is given as a number of physical resource blocks, and wherein the second frequency location is within one physical resource block.

14. A method for a transmitting device, the method comprising:
   transmitting, to an apparatus, one or more synchronization signals of a carrier, wherein a synchronization signal of the one or more synchronization signals corresponds to a frequency located on a first frequency raster; and
   transmitting, to the apparatus, an indication of the carrier frequency that comprises at least one integer number,
   wherein the first frequency raster is a subset of the second frequency raster, and
   wherein a frequency spacing between two neighboring synchronization signals is a multiple of a sub-carrier spacing of the wireless communication system.

15. The method according to claim 14, wherein the indication of the carrier frequency, provided by the transmitting device in the form of at least one integer number, is used by the apparatus to derive the carrier frequency.

16. The method according to claim 14, wherein the at least one integer number is a channel number.

17. The method according to claim 16, wherein a frequency spectrum of the wireless communication system is divided into a plurality of non-overlapping frequency bands, and wherein the channel number is associated with a unique carrier frequency in a frequency band.

18. The method according to claim 17, wherein a range of the channel number depends on the frequency band.

19. The method according to claim 16, wherein the channel number is associated with a unique carrier frequency.

20. The method according to claim 14, wherein the indication of the carrier frequency is transmitted in at least one of the group consisting of: a master information block (MIB), a remaining system information (RMSI), an other system information (OSI), and a radio resource control (RRC).

21. The method according to claim 14, wherein the frequency of a synchronization signal among the one or more synchronization signals is located on the first frequency raster.

22. The method according to claim 14, wherein the first frequency raster is associated with a frequency range where frequencies corresponding to the one or more synchronization signals are deployed.

23. The method according to claim 14, wherein two differing synchronization signals among the one or more synchronization signals correspond to two differing frequency positions in the first frequency raster.

24. The method according to claim 14, wherein the at least one integer number comprises a first index and a second index, the first index indicating an offset indicative of a first frequency location relative to a location of the frequency of the synchronization signal, and the second index indicating a second frequency location relative to the first frequency location.

25. The method according to claim 24, wherein the first frequency location is given as a number of physical resource blocks, and wherein the second frequency location is within one physical resource block.

26. A method for a receiving device, the method comprising:
receiving, from a transmitting device, one or more synchronization signals on a carrier, wherein a synchronization signal of the one or more synchronization signals corresponds to a frequency located on a first frequency raster, and wherein a carrier frequency of the carrier is deployed on a second frequency raster;
receiving, from the transmitting device, an indication of the carrier frequency that comprises at least one integer number; and
deriving the carrier frequency based on the at least one integer number,
wherein the first frequency raster is a subset of the second frequency raster, and
wherein a frequency spacing between two neighboring synchronization signals is a multiple of a sub-carrier spacing of the wireless communication system.

27. The method according to claim 26, wherein the at least one integer number comprises a first index and a second index, the first index indicating an offset indicative of a first frequency location relative to a location of the frequency of the synchronization signal, and the second index indicating a second frequency location relative to the first frequency location.

28. The method according to claim 27, wherein the first frequency location is given as a number of physical resource blocks, and wherein the second frequency location is within one physical resource block.

29. The method according to claim 27, wherein the first frequency location is given as a resolution of the first frequency raster, and wherein the second frequency location is given as a resolution of the second frequency raster.

30. The method according to claim 26, wherein a frequency spectrum of the wireless communication system is divided into a plurality of non-overlapping frequency bands, wherein the at least one integer number is associated with a frequency band, and wherein the carrier frequency is derived by mapping the at least one integer number based on the frequency band.

31. The method according to claim 26, wherein the at least one integer number is a channel number.

32. The method according to claim 31, wherein the channel number is associated with a unique carrier frequency.

33. The method according to claim 26, wherein the indication of the carrier frequency is received in at least one of a Master Information Block, Remaining System Information, Other System Information, and Radio Resource Control.

34. The method according to claim 26, wherein two differing synchronization signals among the one or more synchronization signals correspond to two differing frequency positions in the first frequency raster.

35. A receiving device for a wireless communication system, the receiving device being configured to:
receive, from a transmitting device, one or more synchronization signals on a carrier, wherein a synchronization signal of the one or more synchronization signals corresponds to a frequency located on a first frequency raster, and wherein a carrier frequency of the carrier is deployed on a second frequency raster;
receive, from the transmitting device, an indication of the carrier frequency that comprises at least one integer number; and
derive the carrier frequency based on the at least one integer number,
wherein the first frequency raster is a subset of the second frequency raster, and
wherein a frequency spacing between two neighboring synchronization signals is a multiple of a sub-carrier spacing of the wireless communication system.

36. The receiving device according to claim 35, wherein a frequency spectrum of the wireless communication system is divided into a plurality of non-overlapping frequency bands, wherein the at least one integer number is associated with a frequency band, and
wherein the receiving device is configured to map the at least one integer number based on the frequency band to derive the carrier frequency.

37. The receiving device according to claim 35, wherein the at least one integer number is a channel number.

38. The receiving device according to claim 37, wherein the channel number is associated with a unique carrier frequency.

39. The receiving device according to claim 35, wherein the at least one integer number comprises a first index and a second index, the first index indicating an offset indicative of a first frequency location relative to a location of the frequency of the synchronization signal, and the second index indicating a second frequency location relative to the first frequency location.

40. The receiving device according to claim 39, wherein the first frequency location is given as a number of physical resource blocks, and wherein the second frequency location is within one physical resource block.

* * * * *

UNITED STATES PATENT AND TRADEMARK OFFICE
CERTIFICATE OF CORRECTION

PATENT NO. : 11,290,314 B2
APPLICATION NO. : 17/077750
DATED : March 29, 2022
INVENTOR(S) : Berggren et al.

Page 1 of 1

It is certified that error appears in the above-identified patent and that said Letters Patent is hereby corrected as shown below:

In the Claims

Claim 14: Column 18, Line 33: "a frequency located on a first frequency raster; and" should read -- a frequency located on a first frequency raster, wherein a carrier frequency of the carrier is deployed on a second frequency raster; and --.

Signed and Sealed this
Ninth Day of August, 2022

Katherine Kelly Vidal
*Director of the United States Patent and Trademark Office*